(12) United States Patent
Patarra et al.

(10) Patent No.: US 10,940,846 B2
(45) Date of Patent: Mar. 9, 2021

(54) ELECTROMECHANICAL BRAKE ASSIST SYSTEM

(71) Applicant: Robert Bosch GmbH, Stuttgart (DE)

(72) Inventors: David Patarra, Asnieres-sur-Seine (FR); Francois Gaffe, La Turballe (FR); Philippe Richard, Chelles (FR)

(73) Assignee: Robert Bosch GmbH, Stuttgart (DE)

(*) Notice: Subject to any disclaimer, the term of this patent is extended or adjusted under 35 U.S.C. 154(b) by 406 days.

(21) Appl. No.: 15/757,835

(22) PCT Filed: Sep. 5, 2016

(86) PCT No.: PCT/EP2016/070853
§ 371 (c)(1),
(2) Date: Mar. 6, 2018

(87) PCT Pub. No.: WO2017/045957
PCT Pub. Date: Mar. 23, 2017

(65) Prior Publication Data
US 2020/0231134 A1    Jul. 23, 2020

(30) Foreign Application Priority Data
Sep. 14, 2015 (FR) ..................................... 1558547

(51) Int. Cl.
*B60T 13/74*     (2006.01)
*B60T 11/18*     (2006.01)
*B60T 13/02*     (2006.01)

(52) U.S. Cl.
CPC ............. *B60T 13/745* (2013.01); *B60T 11/18* (2013.01); *B60T 13/02* (2013.01)

(58) Field of Classification Search
CPC ......... B60T 11/18; B60T 13/745; B60T 13/62
(Continued)

(56) References Cited

U.S. PATENT DOCUMENTS 5,425,286 A * 6/1995 Laue ..................... B21K 1/766
                                                        29/428
8,919,239 B2 * 12/2014 Richard ................. B60T 11/18
                                                        91/369.2
(Continued)

FOREIGN PATENT DOCUMENTS

CN      102481905 A     5/2012
CN      103038111 A     4/2013
(Continued)

OTHER PUBLICATIONS

International Search Report dated Nov. 22, 2016, of the corresponding International Application PCT/EP2016/070853 filed Sep. 5, 2016.

*Primary Examiner* — Christopher P Schwartz
(74) *Attorney, Agent, or Firm* — Norton Rose Fulbright US LLP; Gerard Messina

(57) ABSTRACT

An electromechanical brake assist system driven by an electric motor cooperating with a master cylinder and having, along the axis of actuation, a helper piston in the shape of an axial sleeve solidly connected with a guide bracket and having a threaded surface. A nut, fixed in translation but free to rotate, has interior threads that complement those of the helper piston, which it receives, and exterior teeth that cooperate with the drive motor. A plunger piston carries a drive base so it can be pushed by the piston. Its other extremity is connected to the control rod, formed from a body and a head. The body has a crimping area and the head has a sleeve with an extremity that can be crimped along the crimping area.

3 Claims, 3 Drawing Sheets

(58) Field of Classification Search
USPC ..... 60/545–594; 303/114.1; 91/369.1–369.2, 91/376 R; 74/512, 560, 586
See application file for complete search history.

(56) References Cited

U.S. PATENT DOCUMENTS

| | | | | |
|---|---|---|---|---|
| 10,493,969 | B2* | 12/2019 | Gaffe | B60T 13/62 |
| 2008/0302100 | A1* | 12/2008 | Ohtani | B60T 13/745 60/545 |
| 2010/0242469 | A1* | 9/2010 | Jungbecker | B60T 13/745 60/594 |
| 2014/0331666 | A1* | 11/2014 | Zhang | B60T 13/745 60/545 |
| 2016/0152220 | A1* | 6/2016 | Shiwa | B60T 11/18 60/533 |
| 2018/0345932 | A1* | 12/2018 | Gaffe | B60T 11/18 |

FOREIGN PATENT DOCUMENTS

| | | |
|---|---|---|
| EP | 2000376 A1 | 12/2008 |
| JP | 2012106647 A | 6/2012 |
| JP | 6183331 B2 | 8/2017 |

* cited by examiner

ELECTROMECHANICAL BRAKE ASSIST SYSTEM

FIELD

The present invention relates to an electromechanical brake assist system driven by an electric motor cooperating with a master cylinder and having, along the axis of actuation:
- a helper piston in the shape of an axial sleeve solidly connected with a rotating guide bracket for guidance in translation, the sleeve having a threaded outside surface that cooperates with
- a nut, fixed in translation but free to rotate, having interior threads that complement those on the helper piston, which it receives, and having on its exterior a gear connected to the electric drive motor,
- a plunger piston having at its front extremity a drive base that can be pushed by the helper piston and at its back extremity a connection to the control rod,
- wherein the control rod is formed from a body one of whose extremities is connected to the plunger piston and the other to the head of the control rod.

BACKGROUND INFORMATION

Conventional brake assistance systems powered by an electric motor may have a control rod connected to the plunger piston, formed from two parts, a rod body, wherein the extremity not connected to the plunger piston carries a head with a ball stud for connecting to the rod coming from the brake pedal. The head of the control rod is a part matched to the manufacturing client, based on the needs of the type of installation for a given vehicle model.

The ball stud is designed to compensate for a possible alignment fault in the brake pedal rod, this alignment fault being associated either with the installation or the variable orientation imposed on the rod by the movement of the brake pedal. The connection to the ball stud makes it possible to transmit only the thrust component along the axis of the helper system rather than the transverse forces.

Because of this ball stud, the control rod is made of two parts to accommodate assembly of the plunger piston and the control rod through the helper piston, the head of the control rod being screwed to the corresponding end of the body, and consequently it has the shape of a nut. It is only when this assembly is realized that the head of the control rod is screwed on to the threaded end of the body of the control rod.

This solution is comparatively costly because of the production of the threads and the time required for assembly.

SUMMARY

An object of the present invention is to provide a simplification of the brake assist system of the type described above by simplifying the structure of the control rod to facilitate assembly, making it faster and more economical.

An object of the invention is a brake assist system is to provide that the body of the control rod has, at its back end, a crimping area, the head of the control rod having a crimping sleeve at its front extremity that is not turned toward the brake pedal for crimping on the crimping area of the body.

In this way, the present invention simply realizes an assist system whose control rod is suitable, on a case by case basis, for every type of vehicle starting from a shared base that can be used for mass production and requiring modification of only the head of the control rod based on the vehicle type, thereby greatly simplifying the assembly of the head with the body of the rod while preserving the effectiveness of this two-part embodiment and the reliability of the assembly of the two parts of the control rod.

In terms of its assembly, once the control rod has been installed, it is particularly easy to attach the head of the rod.

According to an advantageous characteristic of the present invention, the crimping area of the body is a knurled or grooved surface, of notably transverse orientation to the direction of the axis of actuation xx of the helper system, so that it absorbs the thrust and tractive forces arising between the body and the head forming the control rod.

According to another advantageous characteristic of the present invention, the end of the body of the control rod extends beyond the crimping area in a smooth end and the sleeve on the head has a crimped entryway of reduced thickness, the geometry of the sleeve and its crimped entryway corresponding to the smooth end and crimping area of the body. Thus, the head of the control rod is maintained in the axis of actuation with respect to the body of the rod by the smooth end of the rod housed in the sleeve of the head, and the connection in the direction of the axis of actuation, both for thrust and tractive movements, is maintained by crimping the crimped entryway on the crimping area.

Another object of the present invention is to provide a method for realizing a plunger piston-control rod assembly for an electromechanical brake assist system as described above, this method includes:
- a crimping area is realized at the end of the control rod accommodating the head while leaving a portion smooth,
- the head is realized with a sleeve equipped with a crimping entryway opposite the ball stud,
- having assembled the plunger piston and the control rod, they are engaged in the helper piston and the head is placed on the body of the control rod and the crimping entryway is crimped along the crimping area of the body.

This method of realization and assembly is extremely simple and provides significant savings of material and time in the manufacture of the brake assist system.

BRIEF DESCRIPTION OF THE DRAWINGS

The present invention is described below in greater detail by means of an example of a brake assist system with an electric motor, as shown in the figures.

DETAILED DESCRIPTION OF EXAMPLE EMBODIMENTS

Figure 1:
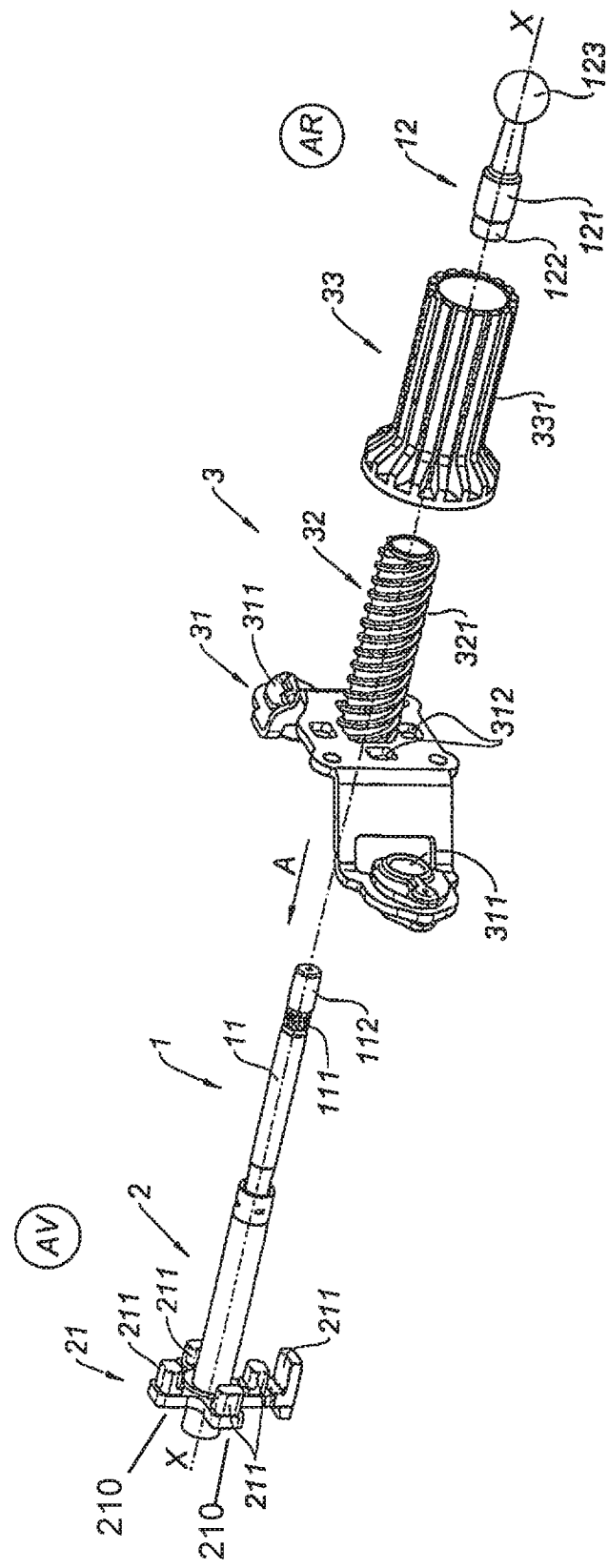
FIG. 1 is an exploded view of the portion of the brake assist system composed of the plunger piston, the control rod, and the helper piston, aligned along the system's xx axis.

To simplify the description, the front (AV) is the left side of the xx axis of FIG. 1 and the rear (AR) is the right side.

The brake assist system according to the present invention, of which only certain elements needed for the description are shown, appears in the exploded view of FIG. 1, composed of a master cylinder (for example, a tandem master cylinder) supplying one or two brake circuits with pressurized brake fluid. The master cylinder is controlled from the brake pedal by a kinematic chain encompassing an actuator in the form of an electric motor, providing, by itself or together with the thrust from the pedal, the force exerted on the primary piston of the master cylinder.

Beginning with the brake pedal, the kinematic chain aligned along line of action xx consists of a rod connected to the pedal and transmitting its movement to control rod 1, which is itself connected to plunger piston 2, to receive the additional helper thrust for acting directly on the master cylinder or by the assist system.

The thrust is transmitted to the tandem master cylinder by a pushrod accommodating a reaction disk against which presses an intermediary piston directly pushed by the helper piston (elements not shown), wherein the plunger piston can also be applied to this reaction disk.

To do so, plunger piston 2 cooperates with helper piston 3 while being directly connected to control rod 1. Helper piston 3 accommodates guide bracket 31, guided in translation and fixed in rotation. Bracket 31 carries threaded sleeve 32, accommodating translation nut 33. It is traversed by plunger piston 2 and control rod 1. Helper piston 3 is supported on the xx axis by bracket 31, equipped with two bearings 311 to slide on two guide rods (not shown) parallel to the xx axis. Helper piston 3 is pushed in the direction of assistance (arrow A) through the cooperation of threaded sleeve 32 and the threads on translation nut 33. The latter, fixed in translation in the direction of axis xx, has interior threads so it can be screwed on threads 321 of sleeve 32 of helper piston 3. On the outside, nut 33 has grooves 331 to accommodate a gear equipped with grooves of a complementary shape, making the assembly rotationally interdependent. This gear (not shown) cooperates with a drive gear on the electric drive motor for brake assistance. Helper piston 3 rests upon drive base 21 integral with plunger piston 2 to push it while it makes contact with an intermediary piston to push, using a pushrod (elements not shown), on the master cylinder (arrow A). Drive base 21 consists of a cross-brace whose two branches 210 are equipped with guide stops 211 in the direction of axis xx. The stops slide in bearings 312 of bracket 31. One of the branches also carries lug 212 parallel to axis xx and cooperating with the trigger sensor to actuate the helper motor after the empty stroke of this type of control at the start of an assisted braking operation.

Plunger piston 2 is connected to control rod 1 formed from body 11 and head 12. The front extremity of body 11 is fixed to the rear extremity, the side not turned to the master cylinder, of plunger piston 2; its rear extremity accommodates head 12 of the control rod. Head 12, formed from sleeve 121 with crimping entryway 122, terminates in the rear at ball stud 123 for connection to the rod from the brake pedal. Crimping entryway 122 is part of sleeve 121 of reduced thickness, and deformable by crimping along crimping area 111. Body 11 of the control rod has crimping area 111, formed by a knurled annular surface, for example in the form of peripheral grooves or channels. These peripheral deformations are oriented primarily in the direction transverse to the axis of actuation, which is also the axis of the actuator rod or its body, so as to provide excellent strength for crimping in the direction of tractive and compressive forces. Crimping area 111 is near the second extremity while nevertheless leaving fitting length 112. Sleeve 121 of head 12 is engaged in extremity 112, 111 of body 11 of the rod, then it is crimped.

Figure 2:
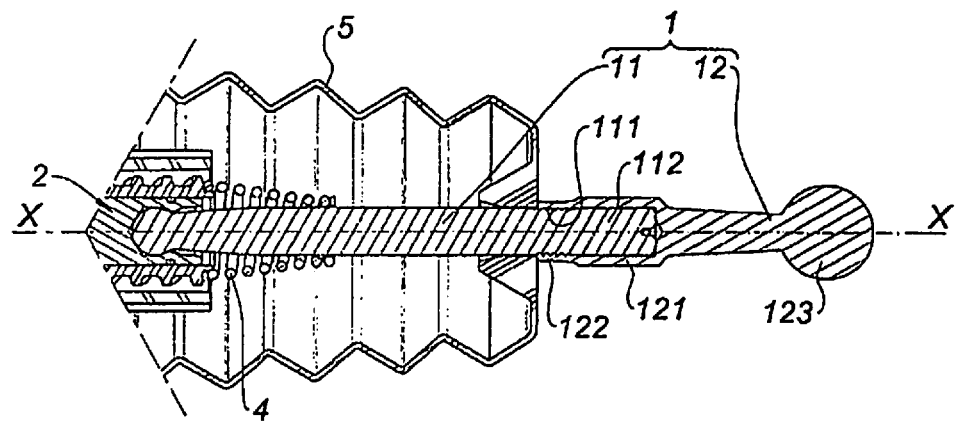
FIG. 2 is an axial cutaway of the plunger piston and the control rod, along with the assembly consisting of the stop for the cutoff spring and the head of the control rod.

FIG. 2 is an axial cutaway illustrating body 11 with its front extremity attached to plunger piston 2 and its rear extremity crimped to sleeve 121 of head 12, this axial assembly being engaged in sleeve 32 of helper piston 3, which is itself engaged in translation nut 33.

Figure 3A:
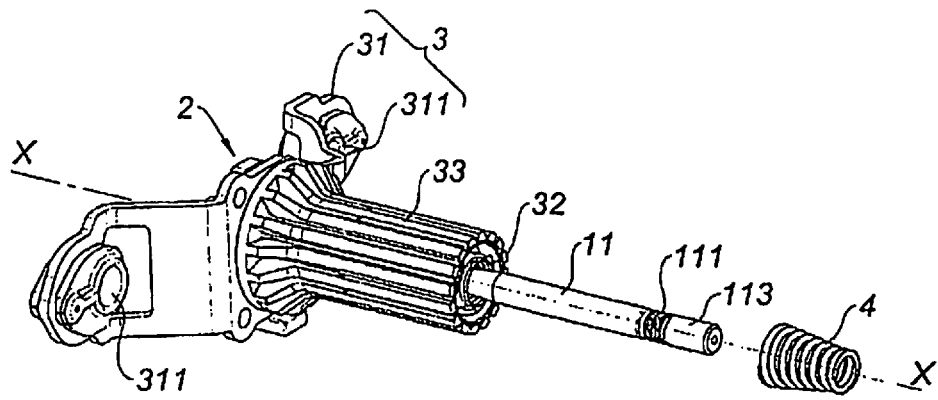
FIGS. 3A-3C illustrate the steps for assembling the plunger piston and the control rod with its control rod head.
Figure 3B:
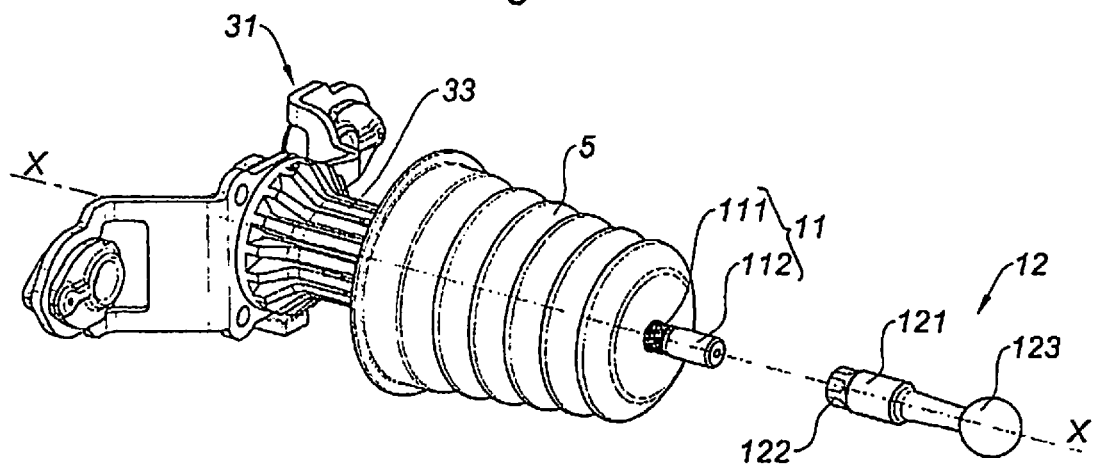
Figure 3C:
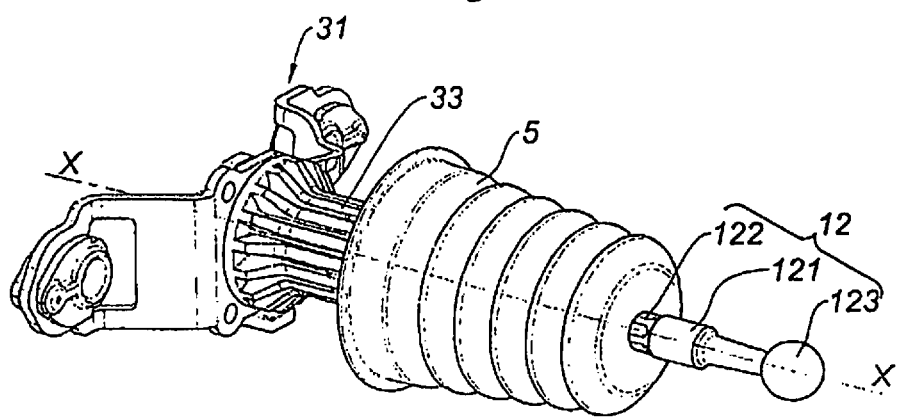

As shown in FIGS. 3A-3C, installation takes place by assembling, along axis xx, plunger piston 2 with body 11 of control rod 1, then installing the plunger piston in helper piston 3, followed by translation nut 33 and cutoff spring 4, then head 12 is installed and crimped. Sleeve 121 serves to maintain head 12 on body 11 in the direction transverse to the axis of actuation to stiffen the assembly and relieve the crimping, which enables the assembly to resist forces in the direction of axis xx, that is, compressive and tractive forces.

As shown in FIG. 3A, plunger piston 2, joined with body 11 of control rod 1, is engaged in helper piston 3, with its bracket 31 and its sleeve hidden by translation nut 33.

Body 11 projects beyond the end of sleeve 32 and nut 33 and leaves visible crimping area 111 and smooth extremity 112.

Cutoff spring 4 is presented on axis xx so it can be fitted on body 11 and come to rest against the extremity of sleeve 32 of helper piston 3, the other extremity of the cutoff spring resting against a lock washer engaged on control rod 1.

FIG. 3B illustrates a subsequent step that includes the installation of elastic sleeve 5, covering body 11 and spring 4, while leaving crimping area 111 and smooth extremity 112 free to accommodate sleeve 121 with its crimping entryway 122.

Sleeve 121 maintains head 12 on smooth part 112 along axis xx, and crimping entryway 122 of reduced thickness allows for the deformation of crimping along crimping area 111.

FIG. 3C illustrates the final disposition of head 12 after crimping, leaving visible the crimping deformations along crimping entryway 122.

Figure 4:
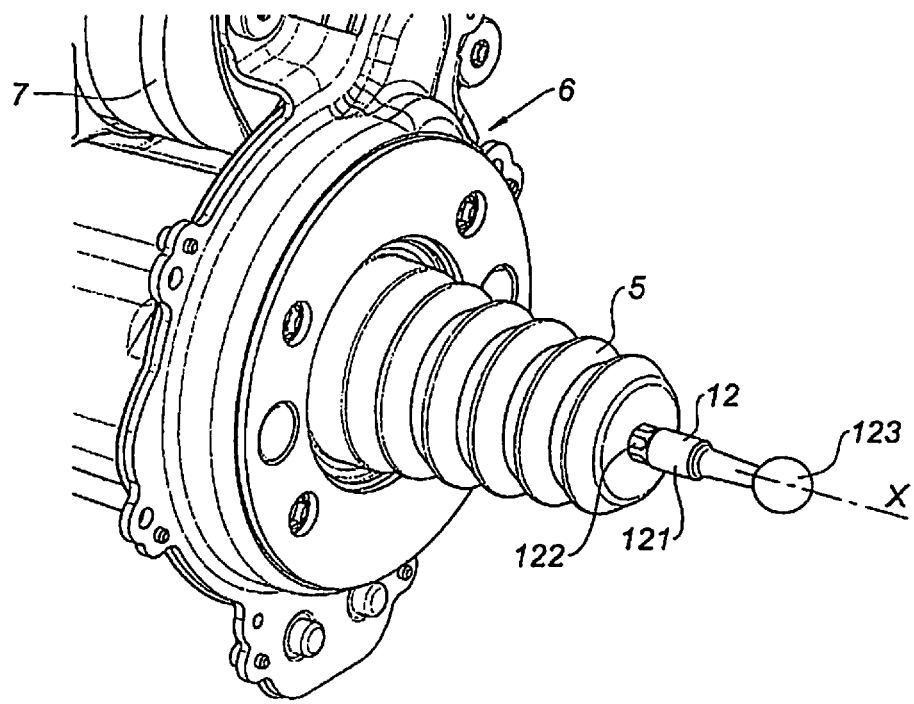
FIG. 4 is a perspective view of the final assembly.

FIG. 4 is a perspective view illustrating the completed installation, showing housing 6 of the helper module and head 12 of the control rod extending beyond sleeve-bellows 5. Sleeve-bellows 5 protects the part of the control rod beyond the translation nut with the cutoff spring.

The transmission of motor 7, partly represented, is hidden by housing 6.

REFERENCE KEY

1 Control rod
11 Body of the control rod
  111 Crimping area
  112 Smooth extremity
12 Head of the control rod
  121 Sleeve
  122 Crimping entryway
  123 Ball stud
2 Plunger piston
21 Drive base
  210 Branch
  211 Guide stop
  212 Lug for trigger sensor
3 Helper piston
31 Bracket
  311 Slide bearing
  312 Slide opening
32 Threaded sleeve
  321 External threads
33 Nut
  331 Groove 4 Cutoff spring
5 Sleeve-Bellows
6 Module housing
7 Electric motor

The invention claimed is:

1. An electromechanical brake assist system driven by an electric drive motor cooperating with a master cylinder, the brake assist system comprising:
- a helper piston accommodating a guide bracket that carries an axial sleeve, the guide bracket being guided in translation and fixed in rotation, the sleeve having a threaded exterior surface, which cooperates with a nut, the nut being fixed in translation but free to rotate, and having internal threads that complement threads of the sleeve, the nut having an exterior surface configured for connection to a gear that in turn is configured for connection to the electric drive motor;
- a plunger piston having at its front extremity a drive base that can be pushed by the helper piston and connected to a control rod at its back extremity;
- wherein the control rod is formed from a body one of whose extremities is connected to the plunger piston and the other extremity to a head;
- wherein the body of the control rod has, at its rear extremity, a crimping area;
- wherein the head has a crimping sleeve at its front extremity, the crimping sleeve crimped onto the crimping area of the body; and
- wherein the crimping area of the body is one of a knurled or grooved surface, whose orientation is transverse to a direction of an axis of actuation.

2. The brake assist system according to claim 1, wherein the front extremity of the body of the control rod extends beyond the crimping area in a smooth surface, and the crimping sleeve of the head has a crimping entryway of reduced thickness, a geometry of the crimping sleeve and the crimping entryway corresponding to the smooth extremity and to the crimping area of the body.

3. A method for providing a plunger piston-control rod assembly of an electromechanical brake assist system, comprising:
- providing a control rod having a body with a crimping area at an end of the control rod for accommodating a head while leaving a portion of the control rod smooth;
- providing the head, the head including a sleeve equipped with a crimping entryway at end of the head opposite a ball stud of the head;
- assembling a plunger piston with the control rod, the plunger piston being engaged with the control rod in a helper piston;
- placing the head on the body of the control rod; and
- crimping the crimping entryway along the crimping area of the body, wherein the crimping area of the body is one of a knurled or grooved surface, whose orientation is transverse to a direction of an axis of actuation.

* * * * *